United States Patent
Freisleben et al.

(10) Patent No.: US 11,772,518 B2
(45) Date of Patent: Oct. 3, 2023

(54) VEHICLE SEAT WITH BLOCKING DEVICE FOR A LOWERABLE SEAT PART OF THE VEHICLE SEAT

(71) Applicant: BROSE FAHRZEUGTEILE GMBH & CO. KOMMANDITGESELLSCHAFT, COBURG, Coburg (DE)

(72) Inventors: Bernd Freisleben, Bad Staffelstein (DE); Ralf Knauf, Untermerzbach (DE)

(73) Assignee: BROSE FAHRZEUGTEILE GMBH & CO., Coburg (DE)

( * ) Notice: Subject to any disclaimer, the term of this patent is extended or adjusted under 35 U.S.C. 154(b) by 1178 days.

(21) Appl. No.: 16/340,495

(22) PCT Filed: Nov. 7, 2017

(86) PCT No.: PCT/EP2017/078432
§ 371 (c)(1),
(2) Date: May 17, 2019

(87) PCT Pub. No.: WO2018/087071
PCT Pub. Date: May 17, 2018

(65) Prior Publication Data
US 2023/0191952 A1 Jun. 22, 2023

(30) Foreign Application Priority Data
Nov. 11, 2016 (DE) ..................... 10 2016 222 192.2

(51) Int. Cl.
*B60N 2/16* (2006.01)
*B60N 2/42* (2006.01)
(Continued)

(52) U.S. Cl.
CPC ............. *B60N 2/02* (2013.01); *B60N 2/1605* (2013.01); *B60N 2/1695* (2013.01); *B60N 2/4214* (2013.01); *B60N 2/933* (2018.02)

(58) Field of Classification Search
CPC .. B60N 2/4221; B60N 2/4228; B60N 2/4214; B60N 2/1695; B60N 2/1605; B60N 2/1615
See application file for complete search history.

(56) References Cited

U.S. PATENT DOCUMENTS

| 3,853,298 A | 12/1974 | Libkie et al. |
| 6,050,635 A | 4/2000 | Pajon et al. |

(Continued)

FOREIGN PATENT DOCUMENTS

| CN | 1133795 A | 10/1996 |
| CN | 2657977 Y | 11/2004 |

(Continued)

OTHER PUBLICATIONS

Chinese First Office action dated Nov. 27, 2020 cited in corresponding CN Application No. 2017800694245, 6 pages, with English translation, 1 page.

*Primary Examiner* — Timothy J Brindley
(74) *Attorney, Agent, or Firm* — LEWIS ROCA ROTHGERBER CHRISTIE LLP

(57) ABSTRACT

It is provided a vehicle seat having a base and a displaceable seat member which when a backrest of the vehicle seat is tilted forward can be lowered at least with a front portion in the direction of the base, wherein there is provided a guiding element which when the front portion of the seat member is lowered can be displaced on a slotted guiding member for the guiding element from a first portion of the slotted guiding member to a second portion of the slotted guiding member. The slotted guiding member or the guiding element is provided on a blocking element of a blocking device of the (Continued)

vehicle seat. The blocking element with the slotted guiding member or with the guiding element can be displaced under the action of acceleration forces which occur in the event of a crash relative to the base.

16 Claims, 6 Drawing Sheets

(51) Int. Cl.
*B60N 2/02* (2006.01)
*B60N 2/90* (2018.01)

(56) References Cited

U.S. PATENT DOCUMENTS

| | | | |
|---|---|---|---|
| 6,254,181 B1 | 7/2001 | Aufrere et al. | |
| 6,502,799 B2 | 1/2003 | Lapaule | |
| 6,974,187 B2 | 12/2005 | Minai | |
| 2006/0055223 A1 | 3/2006 | Thiel et al. | |
| 2007/0107969 A1 | 5/2007 | Ootani et al. | |
| 2015/0239373 A1* | 8/2015 | Weng | B60N 2/42754 |
| | | | 297/216.1 |
| 2022/0305965 A1* | 9/2022 | Lücke | B60N 2/1842 |

FOREIGN PATENT DOCUMENTS

| | | | | |
|---|---|---|---|---|
| CN | 1767966 A | | 5/2006 | |
| CN | 1962318 A | | 5/2007 | |
| DE | 19859197 A1 | | 1/1999 | |
| DE | 69706289 T2 | | 5/2002 | |
| DE | 10003853 B4 | | 8/2004 | |
| DE | 20303753 U1 | | 8/2004 | |
| DE | 10306626 A1 | * | 9/2004 | ......... B60N 2/1615 |
| DE | 202004020462 U1 | | 7/2005 | |
| DE | 102004033222 A1 | | 1/2006 | |
| DE | 102005049303 A1 | | 4/2007 | |
| DE | 19732921 B4 | * | 1/2008 | ......... B60N 2/1615 |
| DE | 102006036121 A1 | | 2/2008 | |
| DE | 102007011524 A1 | | 9/2008 | |
| DE | 102007012429 A1 | | 9/2008 | |
| DE | 102007010974 A1 | | 11/2008 | |
| DE | 102013205459 A1 | | 10/2014 | |
| DE | 102016213071 A1 | * | 1/2018 | ............ B60N 2/10 |
| DE | 202020102168 U1 | * | 6/2020 | |
| DE | 102020106821 A1 | * | 9/2021 | |
| EP | 0949115 B1 | | 8/2003 | |
| EP | 1737698 B1 | | 8/2008 | |
| EP | 4108519 A1 | * | 12/2022 | |
| FR | 2406408 A1 | | 5/1979 | |
| FR | 2747080 A1 | | 10/1997 | |
| FR | 2877284 B1 | | 3/2007 | |
| FR | 2969058 A1 | | 6/2012 | |
| FR | 2996810 A1 | | 4/2014 | |
| GB | 1001435 A | | 8/1965 | |
| GB | 2347620 A | * | 9/2000 | ......... B60N 2/4228 |
| KR | 101272933 B1 | * | 6/2013 | |
| WO | WO97/37869 | | 10/1997 | |
| WO | WO-0234563 A1 | * | 5/2002 | ......... B60N 2/1615 |
| WO | WO2004/078515 A1 | | 9/2004 | |
| WO | WO2006/005684 A2 | | 1/2006 | |
| WO | WO2007/042106 A1 | | 4/2007 | |
| WO | WO2008/014876 A1 | | 2/2008 | |
| WO | WO-2009036880 A1 | * | 3/2009 | ......... B60N 2/1615 |
| WO | WO-2010054411 A1 | * | 5/2010 | ......... B60N 2/4221 |

* cited by examiner

VEHICLE SEAT WITH BLOCKING DEVICE FOR A LOWERABLE SEAT PART OF THE VEHICLE SEAT

CROSS-REFERENCE TO A RELATED APPLICATIONS

This application is a National Phase Patent Application of International Patent Application Number PCT/EP2017/078432, filed on Nov. 7, 2017, which claims priority of German Patent Application Number 10 2016 222 192.2, filed on Nov. 11, 2016. The entirety of both of which are included herein by reference.

BACKGROUND

The disclosure relates to a vehicle seat having a displaceable seat member.

Vehicle seats having a displaceable seat member which can be lowered when a backrest of the vehicle seat is tilted forward are widely known. Such vehicle seats are generally used for a second or third seat row in a motor vehicle and enable, for example, a compact loading position to be assumed. In this instance, a displacement mechanism for the seat member of the vehicle seat which carries a seat cushion generally couples a displacement movement of the backrest with a displacement movement of the seat member. If the backrest is tilted forward, the seat member is lowered. If, in contrast, the backrest is folded back from a tilted-forward position into a position for use again, the seat member is automatically also raised again so that a seat user can sit correctly on it.

There is known for the displacement of the seat member, for example, from DE 10 2007 012 429 B4 or DE 10 2007 011 524 A1 a slotted guiding member system via which a displacement path for the seat member during lowering is predetermined. Part of the slotted guiding member system is, on the one hand, at least one slotted guiding member and, on the other hand, a guiding element which is guided thereon. In order to predetermine a correct displacement path for the seat member during lowering, the guiding element is displaceably guided on the slotted guiding member and in this instance moves from a first portion of the slotted guiding member to a second portion of the slotted guiding member. Whilst a first portion of the slotted guiding member is thereby associated with a raised position and consequently a position for use of the seat member, the second portion of the slotted guiding member is associated with a lowered position and consequently, for example, a loading position of the seat member with the backrest tilted forward.

A corresponding displacement mechanism of the vehicle seat for the displaceability of the seat member when the backrest is tilted forward in principle increases the risk of so-called submarining in the event of a crash. In this instance, a vehicle passenger sinks so far into a seat cushion or is displaced so far downward in the direction of a vehicle floor that the vehicle passenger slides below the hip belt of a seatbelt. This can lead to serious injuries for the vehicle passenger in the event of a crash. A seat member carrying the seat user should in this context in particular be prevented from being able to be lowered in an uncontrolled manner in the event of a crash, whereby the risk of submarining would be significantly increased.

FR 2 747 080 B1, FR 2 877 284 B1 and U.S. Pat. No. 6,974,187 B2 disclose, for example, vehicle seats in which a transverse strut which is secured to a seat member or transverse shaft is guided in a slotted guiding member. The transverse strut or transverse shaft is part of the seat member and is in the event of a crash blocked to prevent (additional) displacement beyond the end of a slotted guiding member in order to prevent uncontrolled displacement of the seat member and consequently a seat user from sinking through below the hip belt of a seat belt.

The devices known from the prior art for crash-related blocking of a seat member of a vehicle seat against a displacement movement which supports submarining are typically comparatively complex and bulky and are provided in addition to any displacement mechanisms for the displacement of the seat member under normal operating conditions.

SUMMARY

Therefore, an object of the underlying the proposed solution is to provide a vehicle seat which is improved in this regard with a seat member which can be lowered and in which the seat member is secured in the event of a crash against an uncontrolled lowering movement.

This object is achieved with a vehicle seat as described herein.

A vehicle seat according to the proposed solution provides for a displacement mechanism for a displacement movement of the seat member so that the seat member, when a backrest of the vehicle seat is tilted forward, brings about a displacement of a guiding element from a first portion of a slotted guiding member to a second portion of the slotted guiding member. For the displacement of the guiding element between the different first and second portions of the slotted guiding member, the guiding element and the slotted guiding member can be displaced relative to each other, wherein this includes the case of the guiding element being able to be displaced when the seat member which is coupled therewith is lowered relative to the slotted guiding member and the slotted guiding member being able to be displaced when the seat member which is coupled therewith is lowered relative to the guiding element. The slotted guiding member or the guiding element is in this instance provided on a blocking element of a blocking device of the vehicle seat which is supported so as to be able to be displaced relative to a base of the vehicle seat. This blocking element can be displaced with the slotted guiding member which is provided thereon under the action of acceleration forces which occur in the event of a crash relative to the base in such a manner that the guiding element in the event of a crash moves from the first portion of the slotted guiding member into abutment with a third portion of the slotted guiding member which is different from the first and second portions in a blocking position in which a lowering of the front portion of the seat member is blocked.

A blocking device provided according to the proposed solution consequently retains via its blocking element the slotted guiding member or the guiding element so as to be displaceable relative to a base which is secured to the floor and which may be formed by a floor carrier in order, on the one hand, when the backrest is tilted forward under normal operating conditions to enable a front portion of the seat member to be lowered by the guiding element and the slotted guiding member being displaced relative to each other, but, on the other hand, in the event of a crash, to secure the seat member against lowering. To this end, the blocking element can be displaced itself relative to the base so that in the event of a crash the guiding element moves into abutment with a third portion of the slotted guiding member and the guiding element is retained thereon in such a manner that a lowering of the seat member is blocked. When the guiding element moves into abutment with the third portion of the slotted guiding member, the seat member is consequently secured against lowering in the direction of the base and consequently in the direction of a vehicle floor via the at least one blocking element of the blocking device. In the blocking position of the guiding element, the blocking element accordingly blocks the displacement of the guiding element and the slotted guiding member relative to each other, whereby a lowering of the seat member which is coupled thereto is prevented.

The displaceably supported blocking element may in principle also be able to be displaced relative to the guiding element (if the slotted guiding member is provided on the blocking element) or relative to the slotted guiding member (if the guiding element is provided on the blocking element) in order when the backrest is tilted forward to enable a lowering of the seat member and the displacement of the guiding element from the first portion of the slotted guiding member to the second portion of the slotted guiding member. The blocking device is in this instance constructed in such a manner that, depending on the size of the force which is applied to the blocking element and via which the blocking element is displaced in a displacement direction, the guiding element reaches either the second portion of the slotted guiding member or the third portion of the slotted guiding member. When the backrest is tilted forward correctly, the guiding element consequently may slide along the slotted guiding member starting from the first portion thereof to the second portion, whereby an associated lowering of the seat member occurs. In the event of a crash and the acceleration forces which consequently act on the blocking element, the blocking element is in contrast displaced abruptly relative to the guiding element or the slotted guiding member so that within the slotted guiding member it moves into abutment with the third portion and the guiding element is consequently present in the blocking position thereof within the slotted guiding member. Via the displaceable blocking element, consequently, the guiding element is, on the one hand, displaceably retained for lowering the seat member between two slotted member portions. On the other hand, the blocking element is constructed and supported in such a manner that in the event of forces which act abruptly thereon—and which exceed the forces introduced by the backrest being tilted forward for a controlled lowering movement of the seat member—the blocking element is displaced with respect to the guiding element or the slotted guiding member to such an extent that the guiding element is present on a third portion of the blocking element in a blocking position and a lowering of the seat member is thereby mechanically blocked.

In a construction variant, the guiding element is articulated to the base of the vehicle seat or provided on a component of the vehicle seat which is articulated to the base. Alternatively or additionally, the guiding element is articulated to the seat member or provided on a component which is articulated to the seat member. In the last variant mentioned, the guiding element may be provided on a lateral member or a seat rocker arm, in particular constructed thereon or fixed thereto, wherein this lateral member or this rocker arm is articulated, on the one hand, via a (rear) articulation connection to the base and, on the other hand, is articulated to a component of the seat member and consequently directly coupled to the seat member. The slotted guiding member which cooperates with the guiding element is in this instance then may be provided, may be formed, on a blocking element which is articulated only to the base and via a (front) articulated connection which—with respect to a longitudinal seat axis—is located in front of the (rear) articulated connection of the lateral member or the rocker arm.

When the backrest is tilted forward, the guiding element may be able to be displaced from the first portion of the slotted guiding member to the second portion and in this instance guided past the third portion. In particular in this variant, there may be provision for the first and second portions of the slotted guiding member to be located one behind the other in an extent direction of the slotted guiding member and for the third portion to be opposite the first portion substantially transversely relative to this extent direction. If in such a variant a pivotably supported blocking element is provided, this may in the event of a crash be displaced in a pivot direction relative to the guiding element or relative to the slotted guiding member so that the guiding element which is first in abutment with the first portion moves into abutment with the opposing third portion in a blocking position.

The third portion of the slotted guiding member may form a shoulder against which the guiding element is in abutment in the blocking position and which blocks a displacement of the guiding element in the extent direction. A displacement of the guiding element in the extent direction would in this instance lead to a lowering of the seat member. Consequently, by implication, a lowering of the seat member is prevented if the guiding element can no longer be displaced in the extent direction.

The shoulder of the third portion of the slotted guiding member for defining a blocking position of the guiding element in the event of a crash can in a construction variant be predetermined by an angled region of the slotted guiding member in which the contour of the slotted guiding member (in a direction counter to the extent direction) has a recess.

In a construction variant, a retention element which protrudes transversely relative to the extent direction is provided between the first and second (slotted member) portions which are located one behind the other in an extent direction of the slotted guiding member. Via such a retention element, a (starting) position of the guiding element which is associated with the position for use of the seat member may be predetermined on the blocking element. Via the protruding retention element, it is ensured in this instance that the guiding element remains in this position on the first portion of the slotted guiding member until, as a result of the backrest of the vehicle seat being tilted forward correctly, a displacement force is introduced into the blocking device in order to lower the seat member.

The retention element may counteract a displacement of the guiding element which is present on the first portion of the slotted guiding member in the direction of the second portion. The guiding element may, however, when the backrest is tilted forward—may be by displacing the blocking element—be able to be displaced beyond the retention element in the direction of the second portion. If, consequently, in this instance via the backrest being tilted forward, a displacement force is transmitted from the seat member and the guiding element to the blocking element, it can at least be displaced to such an extent that the guiding element can be displaced beyond the retention element in the direction of the second portion and the seat member can be lowered. If, in contrast, in the event of crash, independently of the guiding element an acceleration force acts abruptly on the blocking element, the blocking element is displaced (to a greater extent) relative to the guiding element or the slotted guiding member and the guiding element is thereby present on the third portion of the slotted guiding member in a blocking position.

In order when the backrest is tilted forward not to present any excessively high mechanical resistance with respect to the operating comfort, the retention element may have a ramp-like contour for a displacement of the guiding element in the direction of the second portion. The guiding element can consequently slide up on a corresponding ramp portion of the retention element when the backrest is tilted forward in order to facilitate passing the retention element and then to permit a lowering of the seat member.

In a construction variant, the blocking element is resiliently pretensioned, may be by means of at least one resilient element such as a leg spring. The blocking element may be pretensioned by means of at least one resilient element in the direction of the guiding element (or the slotted guiding member). Via the pretensioning of the blocking element in the direction of the guiding element (the slotted guiding member), it is ensured that the blocking element both when the backrest is tilted forward and in the event of a crash can always only be displaced counter to a restoring force which is applied by the at least one resilient element. In this manner, uncontrolled displacement of the blocking element is prevented and in particular in a position for use of the seat member it is ensured that the first portion of the slotted guiding member abuts the guiding element.

In a construction variant, a pivotable bearing of the at least one blocking element of the blocking device is provided. In principle, however, it is also conceivable for the blocking element to be supported with the slotted guiding member or alternatively or additionally so as to be displaceable in a translational manner with the slotted guiding member in order to predetermine over differently constructed regions of the slotted guiding member, on the one hand, a displacement path for the guiding element when the seat member is lowered and, on the other hand, a blocking position for the guiding element in the event of a crash.

In a construction variant, the blocking device has, in addition to a blocking element, which is pivotably supported on a base which is secured to the vehicle floor, may be to a floor carrier of the vehicle seat, a bearing element which is articulated to the same or another element which is secured to the vehicle floor. The bearing element is further also articulated to the seat member or a connection element which is rigidly connected thereto in order by means of a pivot movement of the bearing element to control the lowering and raising of the seat member. On this bearing element, there is provided the guiding element which cooperates with the pivotably supported blocking element.

In a construction variant, the blocking device comprises at least two blocking elements each having a slotted guiding member. In this instance, a guiding element may be displaceably guided on each slotted guiding member. Alternatively, there may be provided a plurality of guiding elements which are each displaceably guided on a slotted guiding member of a blocking element. Whilst in the alternative first mentioned above, there is provided a single guiding element which is displaceably guided on two slotted guiding members of two blocking elements, the last alternative mentioned above makes provision, for two guiding elements which are spatially separated from each other to be displaceably guided in each case on one of two slotted guiding members of two blocking elements.

In the case of a plurality of blocking elements, they may also be rigidly connected to each other in order to ensure a synchronous displacement of the blocking elements.

The guiding element may comprise a transverse shaft or a transverse pipe. Alternatively or additionally, the guiding element may comprise a bolt, journal or a pin. The transverse shaft, transverse pipe, bolt, journal or pin are then arranged in each case so as to be able to be displaced, in particular in a sliding manner in a slotted guiding member of a preferably pivotably supported blocking element in order, on the one hand, when a backrest is tilted forward to enable the seat member to be lowered and, on the other hand, to secure the seat member against being lowered in the event of a crash.

The seat member is a component of the vehicle seat which carries a seat cushion. A seat member may accordingly comprise a seat shell. A vehicle seat according to the proposed solution may further be a vehicle seat for a second or third seat row of a motor vehicle.

BRIEF DESCRIPTION OF THE DRAWINGS

The appended Figures illustrate by way of example possible construction variants of the proposed solution.

DETAILED DESCRIPTION

Figure 1A:
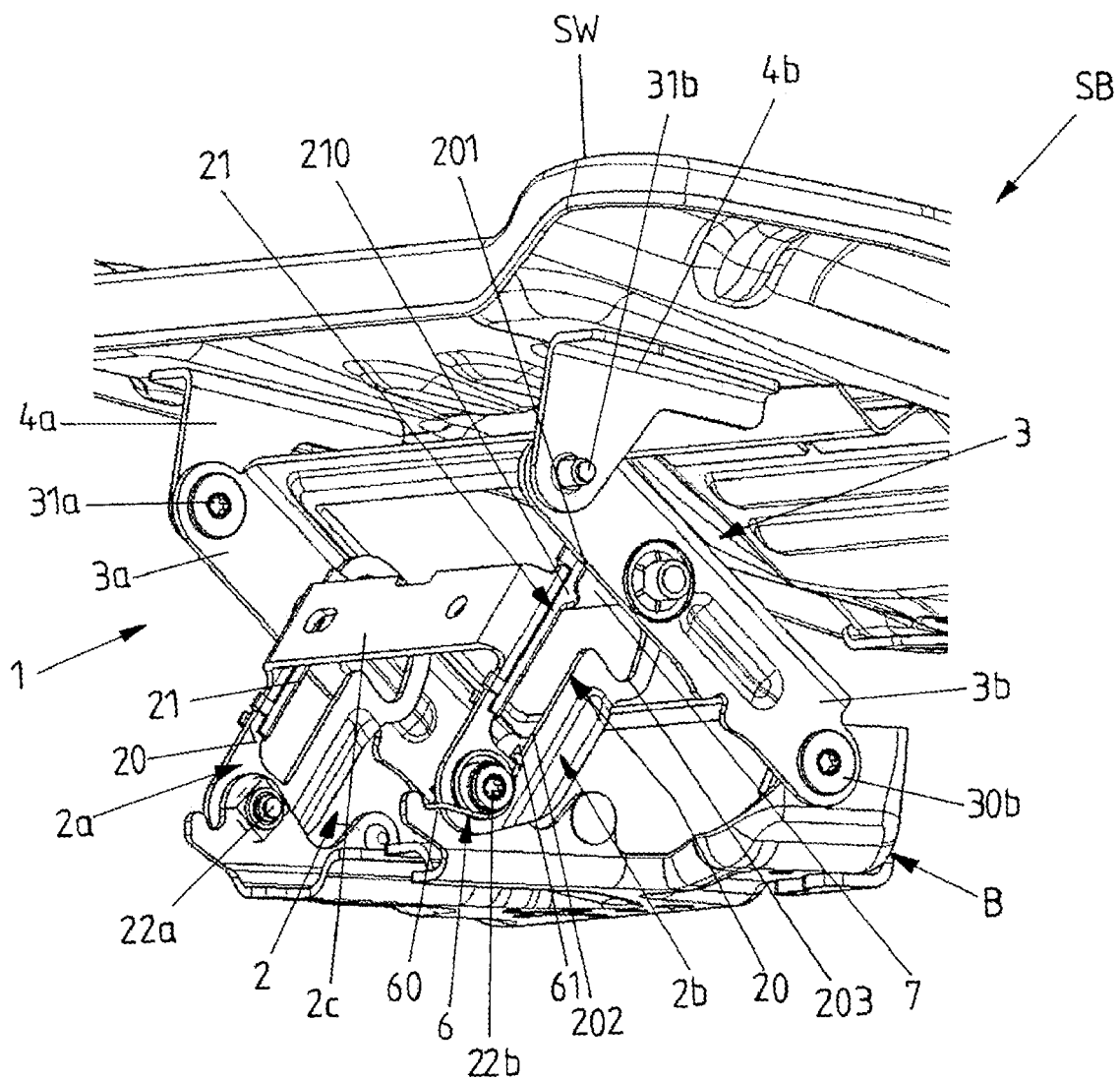
FIGS. 1A-1B show in different views and as cutouts a construction variant of a vehicle seat according to an embodiment with a seat member of the vehicle seat in a position for use.

FIGS. 1A-1B, 2A-2B and 3A-3B show in different views and different positions of a locking device 1 as cutouts a construction variant of a vehicle seat according to the solution with a lowerable seat member in the form of a seat shell SW which acts as a cushion carrier for a seat cushion. The seat shell SW is part of a seat subassembly SB which cooperates with a backrest of the vehicle seat which is not illustrated in this instance.

The vehicle seat which is provided for the second or third seat row of a motor vehicle has a backrest which can be tilted forward into a loading position toward the front onto the seat shell SW. For the compact storage in the loading position, the seat shell SW when the backrest is tilted forward can be lowered downward in the direction of a base in the form of a floor carrier B of the vehicle seat. This floor carrier B serves to fix the vehicle seat with the displacement mechanism thereof for lowering the seat shell SW on a vehicle floor. The displacement mechanism via which the seat shell SW can be lowered with the front portion thereof with respect to a longitudinal seat direction when the backrest is tilted forward in the direction of the floor carrier B comprises in this instance the blocking device 1, which is also referred to below as a crash blocking mechanism.

The crash blocking mechanism 1 comprises a bearing frame 3 which, on the one hand, is articulated to the floor carrier B and which, on the other hand, is articulated to a lower side of the seat shell SW at two connection portions 4a and 4b. Furthermore, the crash blocking mechanism 1 comprises a blocking frame 2. This blocking frame 2 is also articulated to the floor carrier B. The blocking frame 2 further cooperates with a guiding element in the form of a transverse pipe 7 which is fixed to the bearing frame 3. Via the crash blocking mechanism 1 and the displacement mechanism which is defined thereby, on the one hand, a controlled lowering of the seat shell SW is enabled when the backrest is tilted forward, on the one hand, and, on the other hand, the seat shell SW is prevented from being lowered in an uncontrolled manner in the direction of the floor carrier B in the event of a crash, whereby there would be the risk that a seat user of the vehicle seat could slide below a hip belt.

The bearing frame has two mutually opposing side portions 3a and 3b, between which the transverse pipe 7 extends. Each elongate side portion 3a, 3b which is constructed in the manner of a lever is supported on the floor carrier B at a lower end by means of an articulated connection 30a or 30b so as to be able to be pivoted about a rotation axis D2. At an upper end remote therefrom, each side portion 3a or 3b is articulated via another articulated connection 31a or 31b on an associated connection portion 4a or 4b. The two connection portions 4a and 4b are rigidly fixed to a lower side of the seat shell portion SW, for example, welded thereto. The two upper articulated connections 3a and 3b define another rotation axis D3 about which the bearing frame 3 is pivotably retained on the seat shell portion SW.

The transverse pipe 7 which is fixed between the two respective articulated connections 30a and 31a or 30b and 31b on each side portion 3a, 3b extends through two slotted guiding members 20 which are formed by two mutually opposing lateral frame portions 2a and 2b of the blocking frame 2. The side portions 3a and 3b of the bearing frame 3 are located with respect to the lateral frame portions 2a and 2b further outward so that the transverse pipe 7 is arranged between the two outer side portions 3a and 3b on the two slotted guiding members 20 of the lateral frame portions 2a and 2b of the blocking frame 2. The lateral frame portions 2a and 2b are also pivotably supported via articulated connections 22a, 22b on the floor carrier B, in this instance about a rotation axis D1 which extends parallel with the rotation axis D2 of the bearing frame 3. The articulated connections 22a, 22b of the lateral frame portions 2a and 2b are in this instance arranged with respect to the articulated connections 30a, 30b in each case so as to be spaced apart and in front of them in the longitudinal direction of the seat.

The mutually opposing lateral frame portions 2a and 2b are further connected to each other by means of a transverse piece 2c of the blocking frame 2, which extends substantially parallel with the transverse pipe 7. The transverse piece 2c ensures that the two lateral frame portions 2a and 2b are displaced synchronously with each other and serves to reinforce the blocking frame 2.

Each of the lateral frame portions 2a, 2b is resiliently pretensioned by means of a respective resilient element in the form of a leg spring 6 in the direction toward the transverse pipe 7. Each leg spring 6 is supported for this purpose by means of a first spring member 60 of the associated leg spring 6 on the floor carrier B, on the one hand, and via a second spring member 61 on the respective lateral frame portions 2a or 2b, on the other hand. Under the restoring force of the leg springs 6, therefore, the two side frame portions 2a and 2b are resiliently pretensioned in a pivoting direction about the rotation axis D1 in the direction toward the transverse pipe 7.

Figure 1B:
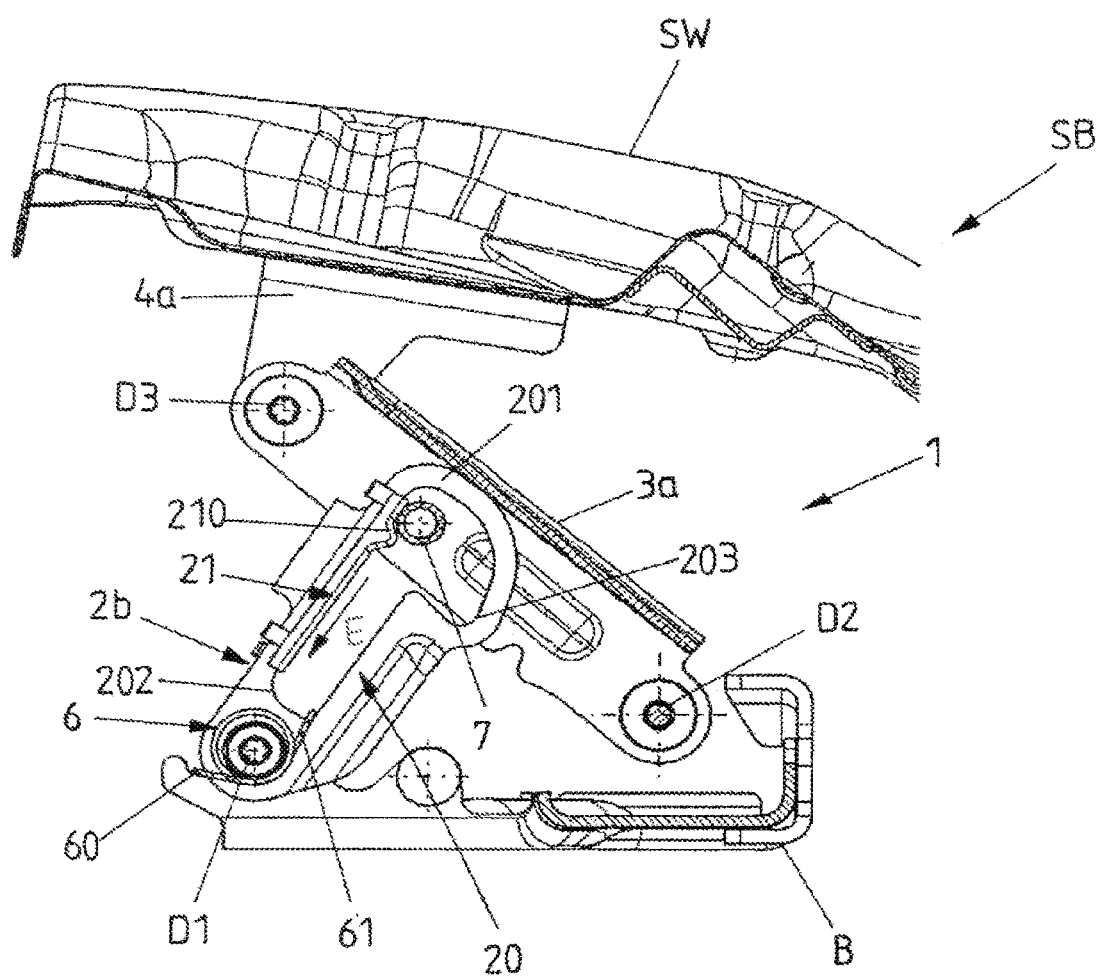

In the position for use of the seat shell SW which is illustrated with reference to FIGS. 1A and 1B and in which the backrest of the vehicle seat is raised and a seat user can correctly sit in the vehicle seat, the transverse pipe 7 is in abutment inside the slotted guiding members 20 of the lateral frame portions 2a and 2b in each case against a first slotted member portion 201. The position of the transverse pipe 7 in this (starting) position on the first slotted member portion 201 is secured by means of a retention element in the form of a retention projection 201. This retention projection 201 protrudes perpendicularly with respect to an extent direction E of the respective guiding size 20 so that the transverse pipe 7 is supported in the direction of the floor carrier B by the retention projection 210. Each retention projection 210 is in this instance formed by a sliding element 21 which is fixed at an edge of the slotted guiding member 20 to a lateral frame portion 2a or 2b. The sliding element 21 extends in this instance in the extent direction E and has with respect to the material of the lateral frame portion 2a or 2b better sliding properties in order when the seat shell SW is lowered to enable a low-friction sliding of the transverse pipe 7 on the slotted guiding member 20 of the respective lateral frame portion 2a or 2b.

Each retention projection 210 has in this instance a ramp-like portion on which the transverse pipe 7 can slide up when the backrest of the vehicle seat is tilted forward and the seat shell portion SW is intended to be lowered. In this instance, the transverse pipe 7 presses against the two retention projections 210 of the lateral frame portions 2a and 2b and pivots the frame portions 2a, 2b counter to the restoring force applied by the leg springs 6 about the rotation axis D1. In this manner, the transverse pipe 7 can be moved past the retention projections 210 and displaced along the two slotted guiding members 20 in the direction of the floor carrier B to a second slotted member portion 202 of the respective slotted guiding member 20 which adjoins the retention projection 210 in the extent direction E. If the transverse pipe 7 is in abutment at the two lateral frame portions 2a and 2b against the second slotted member portion 202 of the respective slotted guiding member 20, in accordance with the FIGS. 3A and 3B the seat shell SW is lowered to the maximum extent and the backrest is tilted forward to the maximum extent into a loading position. The bearing frame 3 and the blocking frame 2 have to this end starting from the relative position illustrated in FIGS. 1A and 1B been pivoted in mutually opposing pivot directions about the rotation axis D1 and D2 on the floor carrier B and have in this instance predetermined for the seat shell SW a defined displacement path in the direction of the floor carrier B.

In order in the event of a crash to ensure that the seat shell SW cannot be lowered, a crash support of the transverse pipe 7 and consequently of the seat shell SW is integrated in the displacement mechanism of the crash blocking mechanism 1. The lateral frame portions 2a and 2b act to this end as blocking elements via which in the event of a crash a displacement of the transverse pipe 7 in a lowering direction toward the floor carrier B and consequently a lowering of the seat shell SW are blocked.

Figure 2A:
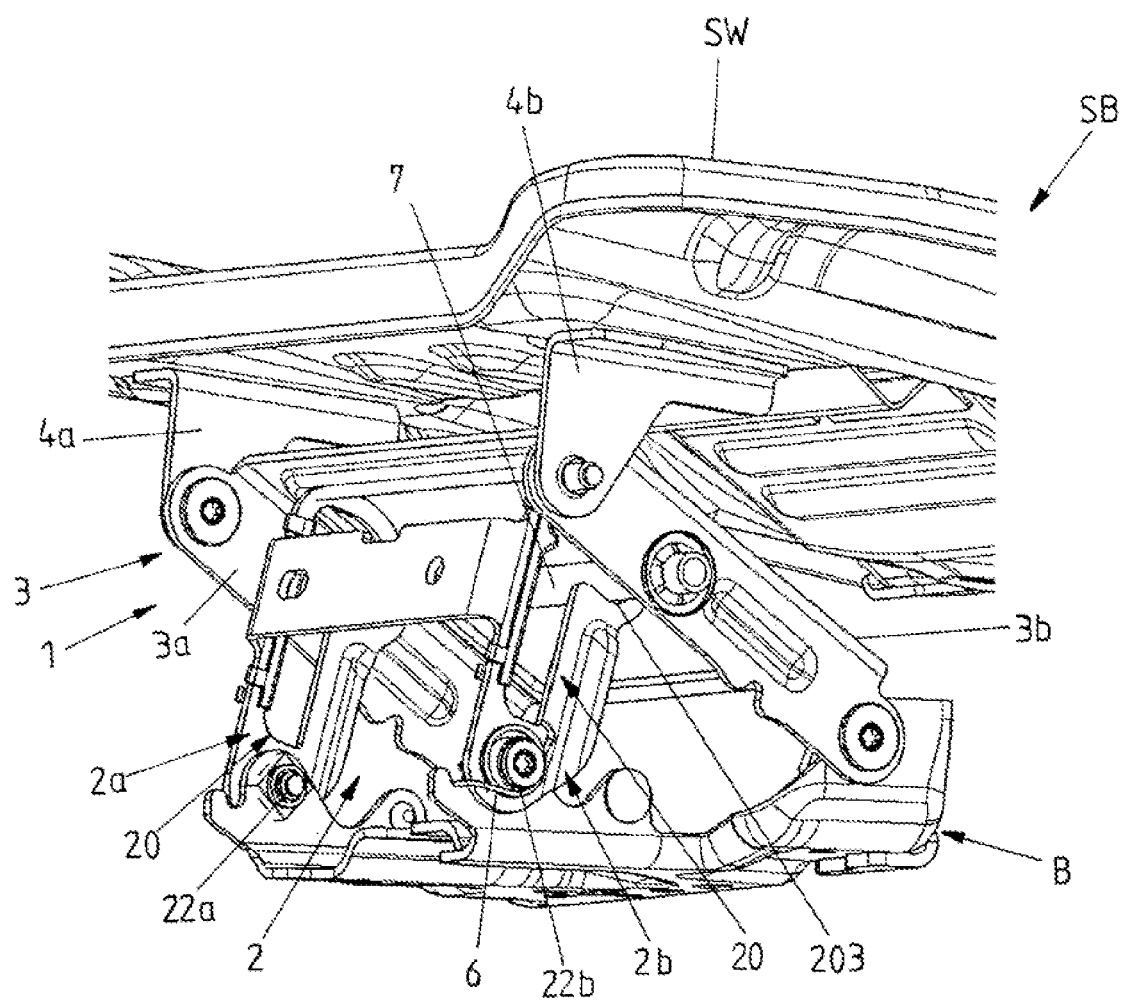
FIGS. 2A-2B show in views which correspond to FIGS. 1A and 1B a blocking device of the vehicle seat in a safety position which is assumed as a result of a crash and in which the blocking device blocks a lowering of the seat member.
Figure 2B:
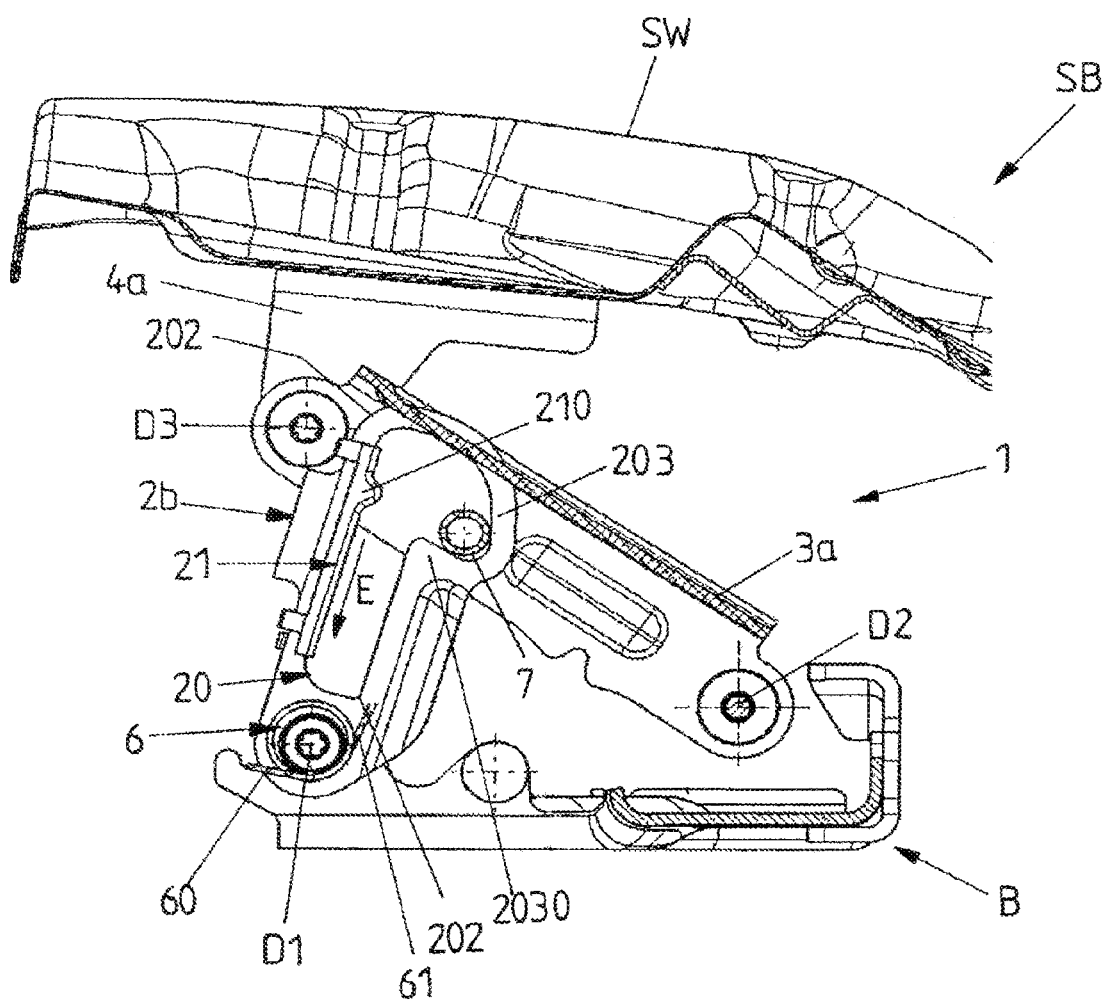
Figure 3A:
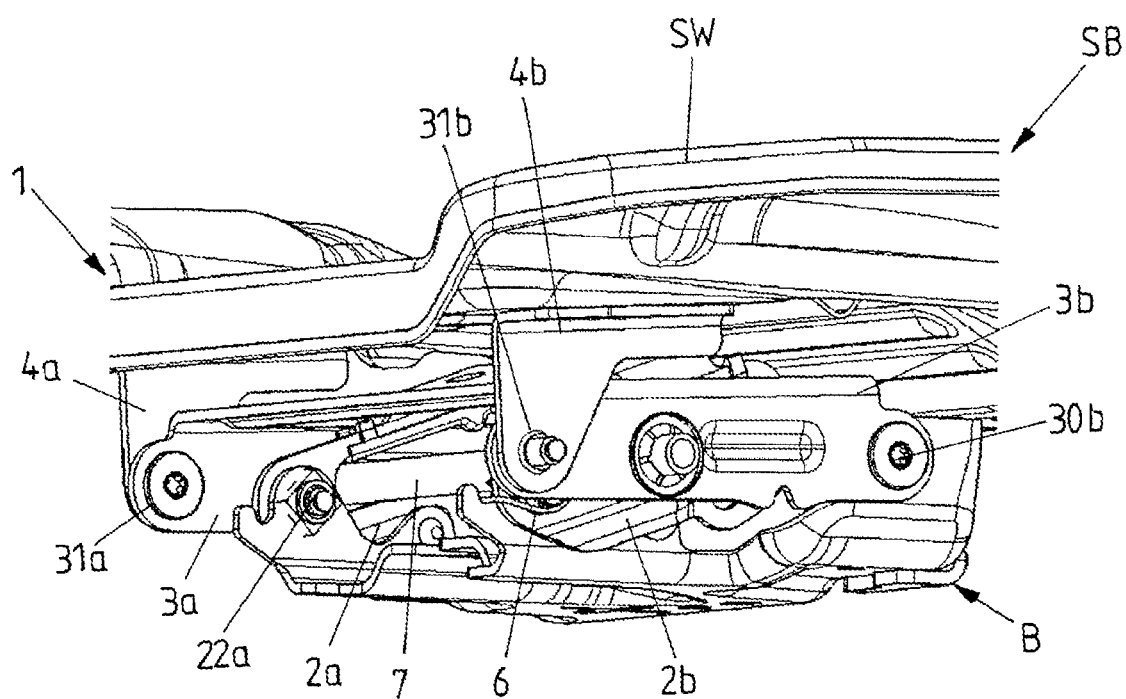
FIGS. 3A-3B show in views which correspond to FIGS. 1A-1B and 2A-2B the seat member in a lowered position.
Figure 3B:
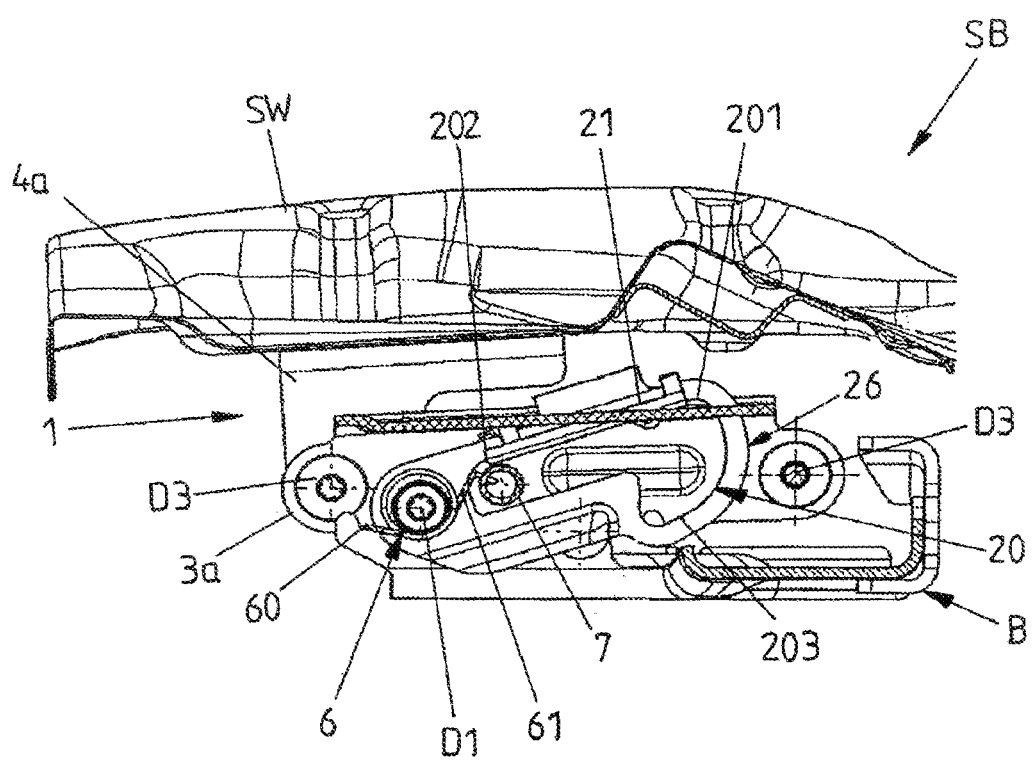

To this end, each slotted guiding member 20 of the two lateral frame portions 2a and 2b is constructed with a third slotted member portion 203 which transversely relative to the extent direction E is opposite the first slotted member portion 201. This third slotted member portion 203 is constituted by a recess in the contour of the respective slotted guiding member 20 and forms a shoulder 2030 which extends transversely relative to the extent direction E. In the region of the third slotted member portion 203, consequently, the respective slotted guiding member 20 does not extend in a linear manner in the extent direction E, but is instead angled transversely relative thereto. Under the action of the acceleration forces occurring in the event of a crash, the two lateral frame portions 2a and 2b can be displaced counter to the restoring force of the leg springs 6 about the rotation axis D1 thereof on the floor carrier B so that the transverse pipe 7 moves into abutment with the angled third slotted member portion 203. The transverse pipe 7 is then thereby in abutment with the two lateral frame portions 2a and 2b in a blocking position in which the shoulder 2030 of the respective third slotted member portion 203 prevents a displacement of the transverse pipe 7 in the extent direction E within the respective slotted guiding member 20 and consequently in the direction of the floor carrier B and blocks a lowering of the seat member SW. As a result of the crash-related pivoting of the lateral frame portions 2a and 2b relative to the transverse pipe 7, the transverse pipe 7 is consequently locked on the lateral frame portions 2a and 2b and the seat shell SW is secured against lowering in the direction of the floor carrier B, as illustrated in FIGS. 2A and 2B.

In summary, consequently, via each slotted guiding member 20 of a lateral frame portion 2a and 2b which is displaceably supported relative to the transverse pipe 7 and which is resiliently pretensioned, a lowering of the seat shell SW is permitted when the transverse pipe 7 slides when the backrest is tilted forward at the correct, comparatively small movement speed over the ramp of the respective retention projection 210 within a slotted guiding member 20. The transverse pipe 7 may consequently be displaced from a first slotted member portion 201 for the position for use of the seat shell SW on the two slotted guiding members 20 along to a second slotted member portion 202 beyond the respective retention projection 210 in order to lower the seat shell SW. In the event of a crash, at the same time an abrupt pivot movement of the lateral frame portions 2a and 2b and the slotted guiding members 20 which are formed thereon is permitted so that the transverse pipe 7 moves into abutment with third slotted member portions 203 in a blocking position. The lateral frame portions 2a and 2b with their slotted guiding members 20 are accordingly catapulted forward in the event of a crash counter to a resilient force so that the transverse pipe 7 is locked in the angled third slotted member portions 203 of the slotted guiding members 20. In this manner, via the lateral frame portions 2a and 2b of the crash blocking mechanism 1 which act as blocking elements, the seat shell SW is mechanically secured against lowering in the direction of the floor carrier B without a separate locking mechanism having to be provided for this purpose on the seat subassembly SB.

In place of a single transverse pipe 7, it is of course also possible to provide two mutually opposing pins, journals or bolts on the two side portions 3a and 3b of the bearing frame 3 which are guided in a sliding manner in a slotted guiding member 20 of an associated lateral frame portion 2a or 2b. Furthermore, it is also not necessary for two blocking elements, in this instance in the form of two lateral frame portions 2a and 2b, to be provided. Alternatively, the use of an individual blocking element which has a slotted guiding member 20 is also possible. An individual pivotably supported blocking element with a slotted guiding member 20 may in this instance engage on a transverse pipe 7 or a transverse shaft of a bearing frame 3. In an alternative construction variant, an individual pivotably supported blocking element cooperates with a laterally protruding journal, pin or bolt which is provided on a bearing element and which is articulated, on the one hand, to a floor carrier B and, on the other hand, to a connection portion 4a or 4b which is rigidly connected to the seat shell SW. A bearing element may, for example, also be a rocker arm to which the seat shell SW or an alternatively constructed cushion carrier is secured.

LIST OF REFERENCE NUMERALS

1 Crash blocking mechanism (blocking device)
2 Locking frame
20 Slotted guiding member
201, 202, 203 Slotted member portion
2030 Shoulder
21 Sliding element
210 Retention projection (retention element)
22a, 22b (Front) articulated connection
2a, 2b Lateral frame portion (blocking element)
2c Transverse piece
3 Bearing frame (bearing element)
30a, 30b (Lower) articulated connection
31a, 31b (Upper) articulated connection
3a, 3b Lateral portion
4a, 4b Connection portion
6 Leg spring (resilient element)
60, 61 Spring member
7 Transverse pipe (guiding element)
B Floor carrier (base)
D1, D2, D3 Rotation axis
E Extent direction
SB Seat subassembly
SW Seat shell (seat member)

The invention claimed is:

1. A vehicle seat having a base and a displaceable seat member which when a backrest of the vehicle seat is tilted forward can be lowered at least with a front portion in the direction of the base, wherein there is provided a guiding element which when the front portion of the seat member is lowered can be displaced on a slotted guiding member for the guiding element from a first portion of the slotted guiding member to a second portion of the slotted guiding member, wherein
   the slotted guiding member or the guiding element is provided on a blocking element of a blocking device of the vehicle seat, and
   the blocking element with the slotted guiding member or with the guiding element can be displaced under the action of acceleration forces which occur in the event of a crash relative to the base in such a manner that the guiding element in the event of a crash from the first portion of the slotted guiding member moves into abutment with a third portion of the slotted guiding member which is different from the first and second portions in a blocking position in which a lowering of the front portion of the seat member is blocked.

2. The vehicle seat as claimed in claim 1, wherein in the blocking position of the guiding element the blocking element blocks a displacement of the guiding element and the slotted guiding member relative to each other in order to block a lowering of the seat member which is coupled to the guiding element or the slotted guiding member.

3. The vehicle seat as claimed in claim 1, wherein when the backrest is tilted forward the guiding element can be displaced from the first portion of the slotted guiding member to the second portion and in this instance moved past the third portion.

4. The vehicle seat as claimed in claim 1, wherein the guiding element is articulated to the base and/or the seat member or the guiding element is provided on a component which is articulated to the base and/or the seat member.

5. The vehicle seat as claimed in claim 1, wherein the first and second portions of the slotted guiding member are located one behind the other in an extent direction of the slotted guiding member and the third portion is opposite the first portion substantially transversely relative to this extent direction.

6. The vehicle seat as claimed in claim 5, wherein the third portion of the slotted guiding member forms a shoulder against which the guiding element abuts in the blocking position and which blocks a displacement of the guiding element in the extent direction.

7. The vehicle seat as claimed in claim 1, wherein the first and second portions of the slotted guiding member are located one behind the other in an extent direction of the slotted guiding member and between the first and second portions a retention element which protrudes transversely relative to the extent direction is provided.

8. The vehicle seat as claimed in claim 7, wherein the retention element counteracts a displacement of the guiding element which is present on the first portion in the direction of the second portion, but the guiding element, when the backrest is tilted forward, can be displaced beyond the retention element in the direction of the second portion.

9. The vehicle seat as claimed in claim 7, wherein the retention element has a ramp-like contour for a displacement of the guiding element in the direction of the second portion.

10. The vehicle seat as claimed in claim 1, wherein the blocking element is resiliently pretensioned.

11. The vehicle seat as claimed in claim 10, wherein there is provided at least one resilient element via which the blocking element which has the slotted guiding member is pretensioned in the direction of the guiding element.

12. The vehicle seat as claimed in claim 11, wherein the blocking element under the action of acceleration forces which are produced in the event of a crash can be displaced counter to a restoring force which is applied by the at least one resilient element relative to the guiding element.

13. The vehicle seat as claimed in claim 1, wherein the blocking element is pivotably supported about a rotation axis.

14. The vehicle seat as claimed in claim 1, wherein the blocking device comprises at least two blocking elements each having a slotted guiding member, wherein one guiding element is displaceably guided on each slotted guiding member or there are provided a plurality of guiding elements which are each displaceably guided on a slotted guiding member of a blocking element.

15. The vehicle seat as claimed in claim 1, wherein the guiding element is provided on at least one bearing element of the vehicle seat which is pivotably supported relative to the blocking element and which is articulated to the seat member or a connection element which is rigidly connected thereto.

16. The vehicle seat as claimed in claim 1, wherein the guiding element comprises a transverse shaft, a transverse pipe, a bolt or a pin.

* * * * *